Sept. 13, 1949.　　　　T. REDMOND　　　　2,481,614
METHOD OF RESISTANCE WELDING ALUMINUM TO
STEEL AND PRODUCT THEREOF
Filed June 27, 1947
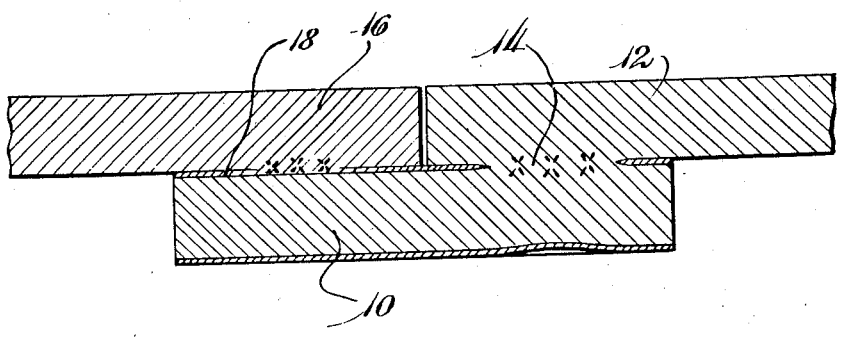
Inventor:
Thomas Redmond
By Henkle, Horton, Ahlberg, Hansmann & Kupper
Attorneys.

UNITED STATES PATENT OFFICE 2,481,614

METHOD OF RESISTANCE WELDING ALUMINUM TO STEEL, AND PRODUCT THEREOF

Thomas Redmond, Indianapolis, Ind., assignor to Stewart-Warner Corporation, Chicago, Ill., a corporation of Virginia Application June 27, 1947, Serial No. 757,691

6 Claims. (Cl. 29—196.2)

The present invention relates to welding and more particularly to what is known as resistance welding. Resistance welding as contemplated under the present invention comprises such processes as seam welding, spot welding, shot welding, and the like. All of these processes have in common the step of placing two pieces of metal in face to face relation and then engaging these pieces on opposite sides by electrodes between which an electric current of high intensity is passed while the pieces are urged together by the pressure upon the electrodes.

Resistance welding processes are limited in their utility because of the inability to seam weld or spot weld dissimilar metals if the dissimilarity in the characteristics of the metals is very great. As an example, so far as I know, it has always been considered useless to attempt the resistance welding of aluminum to stainless steel. The present invention has for its principal objective to provide a method for joining together aluminum or its alloys and stainless steel or similar metals by spot welding, seam welding, or like resistance welding processes.

The single figure of the drawings is a much enlarged diagrammatic sectional view through a portion of an article welded according to the present invention.

The present process, although it is of general application, probably has its principal utility in the aircraft and aircraft accessory industries where stainless steels and aluminum and its alloys are frequently encountered together and often need to be fastened together at some place in the structure. Heretofore, where stainless or other steels and aluminum or its alloys have needed to be joined this has been accomplished by the use of rivets, sheet metal screws, nuts and bolts, or the like. All of these securing arrangements have certain disadvantages over welding, including the inability to provide smooth joints without projections. Further, of course, under most conditions welding is a lower cost operation than is riveting or bolting.

Although so far as I know it is impossible to weld aluminum directly to stainless steel because of the great dissimilarity of these two metals, I have found that stainless steel can be welded to what is known as aluminized cold-rolled steel and that aluminized cold-rolled steel in turn can be welded to aluminum. Aluminized cold-rolled steel is an article of commerce and comprises a sheet of cold-rolled steel which is coated on both sides with a thin layer of substantially pure aluminum. Although this product has other uses, its principal utility in the past has been in the manufacture of heat exchangers or other vessels which are to be subjected to high temperatures. In other words, an aluminum coating on cold-rolled steel has been found to afford a high degree of protection at high temperatures where other protective coatings have little utility.

A typical method of performing my process comprises taking a comparatively narrow strip 10 of aluminized cold-rolled steel and spot welding or seam welding this strip to a piece 12 of stainless steel by using conventional methods. In making such spot welds or seam welds it has been found that the localized heating at the weld point has the effect of vaporizing or otherwise driving the aluminum away from the point of contact 14 between the aluminized cold-rolled steel and the stainless steel so that the sheet of stainless steel is resistance welded directly to the body portion of the cold-rolled steel without any intervening aluminum layer. The bond produced, therefore, is entirely satisfactory and is, in fact, sufficiently strong so that if the two strips are subsequently torn apart one of the strips will tear rather than cause separation at the weld.

Subsequently, another part of the narrow strip 10 of aluminized cold-rolled steel is welded to the aluminum sheet 16 by using the same methods as are conventionally employed for welding together two sheets of aluminum. The result of this latter welding operation appears to be to cause the aluminum sheet 16 to weld to the aluminum layer 18 on the cold-rolled steel without causing any appreciable change in the cold-rolled steel itself. In prying apart welds made in this manner it has been found that the strength limiting factor is usually the strength of the aluminum sheet. In other words, the aluminum sheet tears before causing separation at the weld or before pulling the aluminum coating away from the steel base.

This process has been found to have considerable utility in fabricating certain types of devices in which the problem of joining stainless steel to aluminum has been encountered. Further, the use of this process facilitates the design of some articles in that it readily permits certain parts of an article to be made of aluminum while another portion can be made of stainless steel, whereas formerly it frequently was necessary to fabricate the entire article of one or the other of these metals because of the inability to join aluminum and stainless steel by resistance welding.

The orientation of the aluminum piece relative to the stainless steel piece at the weld is largely a matter of choice. I have found that for most purposes an extremely smooth assembly of the stainless steel and aluminum elements can be accomplished by abutting the edges of the stainless steel and aluminum sheets and overlapping these sheets on one side at the juncture line with a strip of aluminized cold-rolled steel which is welded both to the aluminum sheets and the stainless steel as previously described. Although the process is not limited to this specific type of joint the above will serve as an example of one manner of practicing this process. It will be appreciated, of course, that in this process various other kinds of steel may be substituted for the stainless steel since most steels can satisfactorily be welded to aluminized steel.

Having described my invention, what I claim as new and useful and desire to secure by Letters Patent of the United States is:

1. The method of joining a sheet of stainless steel or the like to a sheet of aluminum which comprises providing a piece of aluminized steel, resistance welding the sheet of stainless steel to the piece of aluminized steel and resistance welding the piece of aluminized steel to the sheet of aluminum.

2. As an article of manufacture, a fabricated object composed partially of stainless steel and partially of aluminum and so arranged that at portions thereof a stainless steel edge abuts an aluminum edge, said abutting edges being overlapped by a piece of aluminized cold-rolled steel, said piece being joined to said aluminum by resistance welding and to said stainless steel by resistance welding.

3. The method of securing a piece of aluminum to a piece of steel which comprises resistance welding the piece of aluminum to a piece of aluminized steel and resistance welding the piece of aluminized steel to the piece of steel.

4. As an article of manufacture, a piece of aluminized cold-rolled steel resistance welded to a piece of aluminum over a portion of its area and resistance welded to a piece of steel over another portion of its area.

5. The method of fabricating a composite object made up partially of stainless steel and partially of aluminum which comprises providing a piece of steel coated with a thin layer of aluminum, resistance welding the last said piece directly to the stainless steel under current and pressure conditions such that the body portion of the stainless steel is welded directly to the body portion of the steel beneath the aluminum coating, and welding the aluminum to the coating upon the aluminum coated steel piece.

6. A fabricated article of manufacture composed partially of aluminum and partially of stainless steel or the like and so arranged that at portions thereof a stainless steel edge is adjacent an aluminum edge, said adjacent edges being overlapped by a piece of sheet steel coated with aluminum, said piece being jointed to said aluminum by resistance welding the aluminum to said coating and said piece being joined to said stainless steel by resistance welding the stainless steel to the body portion of the steel piece beneath the aluminum coating.

THOMAS REDMOND.

REFERENCES CITED

The following references are of record in the file of this patent:

UNITED STATES PATENTS

| Number | Name | Date |
|---|---|---|
| 2,270,278 | Dunn | Jan. 20, 1942 |